United States Patent
Kummer et al.

(10) Patent No.: US 9,697,300 B2
(45) Date of Patent: Jul. 4, 2017

(54) GRAPH SYNTAX VALIDATION SYSTEM AND METHOD

(71) Applicant: Software AG, Darmstadt (DE)

(72) Inventors: Thomas Kummer, Saarbruecken (DE); Markus Brueck, Ettenheim (DE)

(73) Assignee: Software AG, Darmstadt (DE)

( * ) Notice: Subject to any disclaimer, the term of this patent is extended or adjusted under 35 U.S.C. 154(b) by 458 days.

(21) Appl. No.: 14/244,226

(22) Filed: Apr. 3, 2014

(65) Prior Publication Data

US 2015/0286947 A1    Oct. 8, 2015

(51) Int. Cl.
 *G06F 17/30* (2006.01)
(52) U.S. Cl.
 CPC .............................. *G06F 17/30958* (2013.01)
(58) Field of Classification Search
 None
 See application file for complete search history.

(56) References Cited

U.S. PATENT DOCUMENTS

| | | | |
|---|---|---|---|
| 7,398,197 B1* | 7/2008 | Mohri | G10L 15/193 704/1 |
| 8,578,346 B2 | 11/2013 | Chao et al. | |
| 2007/0006179 A1* | 1/2007 | Tjong | G06F 8/51 717/136 |
| 2007/0006196 A1* | 1/2007 | Tjong | G06F 8/51 717/151 |
| 2009/0228474 A1* | 9/2009 | Chiu | G06F 17/30516 |
| 2014/0074888 A1* | 3/2014 | Potter | G06F 17/30398 707/779 |

OTHER PUBLICATIONS

Tristan et al, "Evaluating Value-Graph Translation Validation for LLVM", Paper presented at ACM SIGPLAN Conference on Programming and Language Design Implementation, Jun. 4-8, 2011, San Jose, California.*
Bibliowicz et al, "A graph grammar-based formal validation of object-process diagrams", Softw Syst Model (2012), 11:287-302, Published online: Apr. 30, 2011, Springer-Verlag 2011.*
Fecko et al, "Using Semicontrollable Interfaces in Testing Army Communications Protocols: Application to MIL-STD 188-220B", Proc. IEEE Military Comm. Conf. (MILCOM), Atlantic City, NJ, Oct. 1999.*

(Continued)

*Primary Examiner* — Ilya Traktovenko
(74) *Attorney, Agent, or Firm* — Posz Law Group, PLC

(57) ABSTRACT

A graph syntax validation system, method, or computer-readable medium that receives: (i) an input graph, (ii) transformation rules, and (iii) a minimal valid graph. The system/method/computer-readable medium transforms the input graph into the minimal valid graph using the transformation rules that are comprised of source patterns and target patterns. The system/method/computer-readable medium recurrently transforms the input graph until either the input graph has been reduced to the minimal valid graph indicating that the input graph uses a valid syntax, or until it is determined that one or more transformation rules do not match the input graph indicating that the input graph uses an invalid syntax.

15 Claims, 18 Drawing Sheets

(56) References Cited

OTHER PUBLICATIONS

Inaba et al, "Sound about the bad soccer I and Complete Validation of Graph Transformations", Grace-TR-Apr. 2010, Center for Global Research in Advanced Software Science and Engineering National Institute of Informatics, 2-1-2 Hitotsubashi, Chiyoda-Ku, Tokyo, Japan, May 2010.*

Kong et al, "A Graph Grammar Approach to Software Architecture Verification and Transformation", Department of Computer Science, The University of Texas at Dallas, Richardson, Texas 75080-0688, USA, Proceedings of the 27th Annual International Computer Software and Applications Conference (COMPSAC'03) 0730-3157/03 $ 17.00 2003.*

U.B. Ighoroje, O. Maiga and M.K. Traore, Abstract: "The DEVS—Driven Modeling Language: Syntax and Semantics Definition by Meta-Modeling and Graph Transformation", Mar. 2012.

* cited by examiner

First Rule:

Second Rule:

Minimal Valid Graph:

Input Valid Graph:

First Intermediate Result:

Second Intermediate Result:

GRAPH SYNTAX VALIDATION SYSTEM AND METHOD

TECHNICAL FIELD

The technical field relates in general to graph based information systems.

BACKGROUND

Graph based information systems use various types of notation standards to represent the information contained therein. For example, the Business Process Model Notation (BPMN) or Event-driven Process Chain (EPC) notation are used if the graph represents a process, whereas the Entity Relationship Model (ERM) or the Unified Modeling Language (UML) are used if the graph represents a data structure.

The commonality that exists among these various notations is that a graph is only valid if it matches the syntax of a specified notation. This is true because the validity of a graph's syntax is the precondition for the semantic correctness of the information that is represented in the graph.

One of the problems with current graph information systems is that they only check dedicated parts of graph syntax. These systems check validity using semantic checks that are implemented using a programming language. However, this type of implementation is applicable to a specific type of graph notation (for example, BPN) and requires that the user have knowledge of the specified programming language.

Since current graph information systems are not generic, every graph notation requires a new semantic check. Additionally, these systems are only accomplishing basic syntax checks and fail to check the complete syntax of a graph.

FIG. 21 is an example of a BPMN Collaboration diagram with an invalid syntax. FIG. 21 illustrates a start event 2115, Gateway 2101, Task A 2111, Task B 2113, Gateway 2103, and end event 2117. The control flow from start event 2115 to end event 2117 is split up by an exclusive Gateway 2101 (meaning that only one of the two paths can be taken). However, Gateway 2103 is an inclusive gateway (meaning that both input control flows are required before the process can terminate). This type of invalid syntax is typically overlooked by current semantic checks.

The traditional model/graph transformation system transforms one model from one representation to another representation (e.g., a BPMN model into a Business Execution Process Language (BEPL) model). During this type of transformation the semantic remains the same. Additionally, all transformation patterns are executed on the source model and the result of the transformation patterns is used to build the target model graph.

The traditional model generation system (e.g., DEVS-Driven Modeling Language) uses a metamodel to build a system that is able to generate valid graph models that match the syntax of the metamodel. These systems generate models with a valid syntax (for the given metamodel), but it is not possible to check if a given model, which was generated by or imported from another system, matches the syntax. Another problem with the model generation approach is that the generation system always needs to be created before it can be used to generate a valid model.

The traditional automated repair and validation system may improve the import of process flow drawings from drawing tools (e.g., Microsoft Visio) into process modeling tools (e.g., ARIS or IBM WebSphere). However, the automated repair and validation system is not designed to validate models that are originally created in process modeling tools. This limitation exists because the repair actions of the system are restricted to specific issues that typically occur if a model drawing is imported in a process model tool. Additionally, the repair and validation system describes only simple rules that are based on one node of the model. Yet another problem with this system is that its use is limited to the improvement of the import of drawings in a process management tool, rather than the broader use of supporting a user of a process management tool to model syntax correct models.

One or more embodiments discussed herein can address the aforementioned problems, with traditional systems, by enabling the user to completely check if a given graph matches a syntax notation. The graph syntax validation system may also be used to define graph syntax and validate graphs using a newly defined syntax.

SUMMARY

Accordingly, one or more embodiments provide a method, system and/or non-transitory computer readable medium for graph syntax validation.

Accordingly, an embodiment provides a method for graph syntax validation comprising receiving, by a processor, (i) an input graph that contains one or more input graph nodes, (ii) transformation rules, and (iii) a minimal valid graph; and transforming, by the processor in response to receiving the input graph, the input graph into the minimal valid graph using the transformation rules, including a source pattern and a target pattern. The transforming step further comprises source pattern-matching by comparing the input graph with the source pattern of the transformation rules and determining whether the input graph matches the source pattern of one or more transformation rules; and rule-executing, by replacing the input graph nodes that are determined to match the source pattern of one or more transformation rules with the target patterns for the one or more transformation rules.

In an embodiment, the process of rule matching and execution is iterative; in each one transformation step only one matching rule is executed. The executed rule forms a new graph for the next transformation step. After the transformation step is done, the pattern matching may be started again to find a matching rule. That is, (1) pattern matching, (2) execution of a rule, preferably a single rule, (3) check minimal graph, (4) if not, repeat back to (1).

The transforming step recurs until either the input graph has been determined to be reduced to the minimal valid graph indicating that the input graph uses a valid syntax, or until it is determined that none of the transformation rules match the input graph indicating that the input graph uses an invalid syntax.

According to another embodiment, the method further comprises result-visualizing, by the processor, the transformation result.

According to yet another embodiment, the method further comprises design-facilitating the minimal valid graph and the transformation rules.

According to another embodiment, the method further comprises design-facilitating using non-terminal symbol design tools to generate intermediate transformation results.

According to still another embodiment, the processor further comprises design-facilitating using placeholder design tools for use in the source pattern and the target patterns.

An embodiment provides a computer system that comprises a processor configured to receive (i) an input graph that contains one or more input graph nodes, (ii) transformation rules, and (iii) a minimal valid graph; transform, in response to receiving the input graph, the input graph into the minimal valid graph using the transformation rules, including a source pattern and a target pattern; source pattern-match by comparing the input graph with the source patterns of the transformation rules and determining whether the input graph matches the source pattern of one or more transformation rules; and rule-execute, by replacing the input graph nodes that are determined to match with the source pattern of one or more transformation rules with the target patterns for the one or more transformation rules.

In an embodiment, the processor recurrently transforms until either the input graph has been determined to be reduced to the minimal valid graph indicating that the input graph uses a valid syntax, or until it is determined that none of the transformation rules match the input graph indicating that the input graph uses an invalid syntax.

According to another embodiment, the processor is further configured to result-visualize the transformation result.

According to yet another embodiment, the processor is further configured to design-facilitate the minimal valid graph and the transformation rules.

According to another embodiment, the processor is further configured to design-facilitate using non-terminal symbol design tools to generate intermediate transformation results.

According to still another embodiment, the processor is further configured to design-facilitate using placeholder design tools in the source pattern and the target patterns.

Yet another embodiment provides a non-transitory computer readable medium, which can perform a method according to one or more of these embodiments.

In another embodiment, a user can initiate a check process to trigger transformation rules for a given input graph, to transform into the minimal valid graph using the one or more transformation rules, and the check process can process recursively without requiring further user input, until an end result is achieved (i.e., transformation into the minimal valid graph, or failure to be able to be transformed into the minimal valid graph).

In another embodiment, parts of the input graph which are inconsistent with the transformation rules and/or minimal valid graphs are indicated. In still another embodiment, candidate suggestions are provided as to possibilities for replacing the parts of the input graphs which are inconsistent with the transformation rules. In the embodiment, the transformation rules can be executed independent from their order.

One, or a combination of more than one, or all, of the above embodiments, can be combined and provided as a single document.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Figure 1:
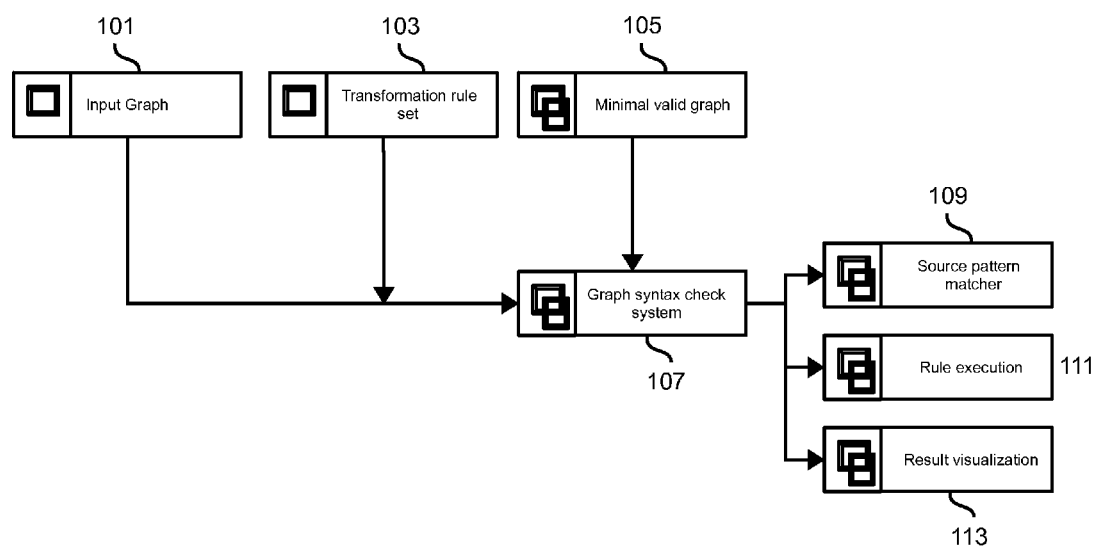
FIG. 1 is a block diagram illustrating the input requirements and the components of the graph syntax validation system.

In overview, the present disclosure concerns a graph syntax validation system, which enables a user to check if a given input graph matches a specified syntax notation. The system also enables the user to use the system to define new graph syntax and validate graphs against that new graph syntax. The system uses a transformation-based approach to simplify the input model until the model is transformed into a model that is known to be valid. The transformation-based approach is generic and allows a user to define a complete syntax check for graph-based notation (such as BPMN or EPC, for example) without having specified computer programming knowledge.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

DEFINITIONS

The claims may use the following terms, which are defined to have the following meanings for the purpose of the claims herein. Other definitions may be specified in this document.

The term "computer system" or "computer" used herein denotes a device sometimes referred to as a computer, laptop, personal computer, personal digital assistant, notebook computer, personal assignment pad, server, client, mainframe computer, or evolutions and equivalents thereof.

The term "BPMN" is used herein to denote "Business Process Model Notation" which is a graphical representation for defining business processes in a business process model.

The term "EPC" is used herein to denote "Event-driven Process Chain" which is a type of flowchart used for business process modeling. EPC's are used to configure enterprise resource planning and business process improvements.

The term "ERM" is used herein to denote an entity-relationship model, which is a data model for describing the data or information aspects of a business or its process requirements.

The term "UML" is used herein to denote "Unified Modeling Language" which is a modeling language in the field of software engineering.

The term "API" is used herein to denote an application programming interface, which specifies how software components should interact with each other. An API can be used to ease the work of programming graphical user interface components.

The term "semantic" is used herein to denote the processes a computer follows when executing a program in a specific language.

<End of Definitions>

The graph syntax validation system transforms a given graph into a graph that is known as valid. All graph notations include a minimal valid graph that matches the notation. The graph syntax validation system transforms the input graph into the minimal valid graph using a set of transformation rules. The transformation rules and the minimal valid graph depend on the graph notation that will be checked. All other parts of the graph syntax validation system are independent from the checked notation.

The rules are defined so that the checked graph is simplified to become more like the minimal valid graph. This is accomplished based on the number of elements in the rules or by the level of the elements in the rules.

The rules of the rule set are applied to the graph until the minimal valid graph is constructed or no rule matches the input graph. If a rule is applied the input graph is changed and this changed graph is used for the next iteration of rule application. If the graph is transformed to the minimal valid graph, then the graph matches the syntax defined by the transformation rules. However, if the graph cannot ultimately be transformed to the minimal valid graph, then the graph does not match the syntax.

The graph syntax validation system requires a set of rules to deviate the minimal valid graph from a given graph. Every rule may include at least two parts (and may or may not include other parts which are not discussed herein). The first part is the source pattern. The source pattern is the part that needs to match the input graph as precondition that the rule can be applied. The second part of the rule is the target pattern. The target pattern contains the elements that will be generated to replace the matching source pattern. Every rule may include three parts: source pattern, target pattern, and the mapping between source pattern and target pattern.

The generated elements need to be "less complex" to ensure that the graph is transformed into a simpler version of the graph. The simplest graph is the minimal valid graph. The term "less complex" can mean that the generated target has fewer elements than the source pattern. Accordingly, every rule execution removes nodes from the graph until the graph equals the minimal valid graph.

Another way that an input graph can become "less complex" would be a scenario when the target pattern has equal or more nodes than the source pattern, but the nodes are a simpler type of node. For example in the BPMN notation, a pattern which exchanges a sub process node with a function would result in a "less complex" graph.

The set of transformation rules are confluent and do not depend on the order of the executed rules. Confluence is established by rules that use patterns to simplify the graph and by using algorithms (e.g. with the Knuth-Bendix completion algorithm) to check the transformation rules, as they are being designed and established.

The set of rules needs to be complete so that every model that matches the graph notation can be transformed. Using syntax check tests during the development phase of the transformation rules can ensure the completeness of the rules.

The user creates the transformation rules. In some instances, it may be advisable for the user to begin with the minimal valid model and then determine of the rules that may be required to generate, from the minimal valid model, every model that matches the notation.

Rule Matching

Most graph notations include various types of nodes (e.g. functions, events, gateways, etc.) and various types of connections. Accordingly, the rule matching should support the matching of nodes based on node types and the matching of connections based on connection types.

Consider an example where one node of the rule source pattern is marked as the start node. If a node with the same symbol is found in the input graph, then the entire source pattern is checked. The source pattern is only considered to match if the node from the input graph that was matched to the start node is part of a subset of the same structure as the source pattern. The term subset, herein, is used to define a portion of the input graph that is being compared to the source pattern.

Referring now to FIG. 1, a block diagram illustrating the input requirements and the components of the graph syntax validation system will be discussed and described. This diagram illustrates that the system can use as input (i) the input graph 101 that is being checked; (ii) the transformation rule set 103; and (iii) the minimal valid graph 105. The graph syntax check system 107 uses these three types of input to determine graph syntax validation and output results via the source pattern matcher 109 and the rule execution 111, and (optionally) provides the result visualization 113.

Figure 2:
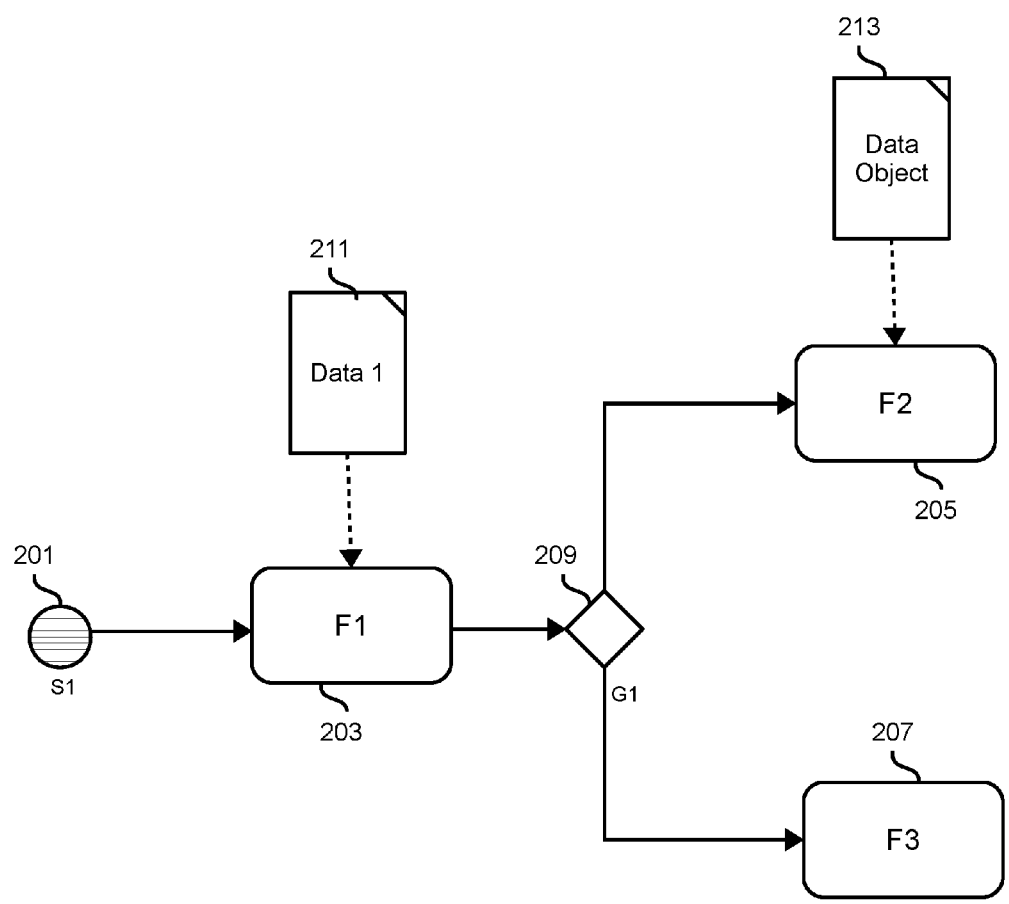
FIG. 2 is a block diagram illustrating a part of the graph in the BPMN notation.
Figure 3:
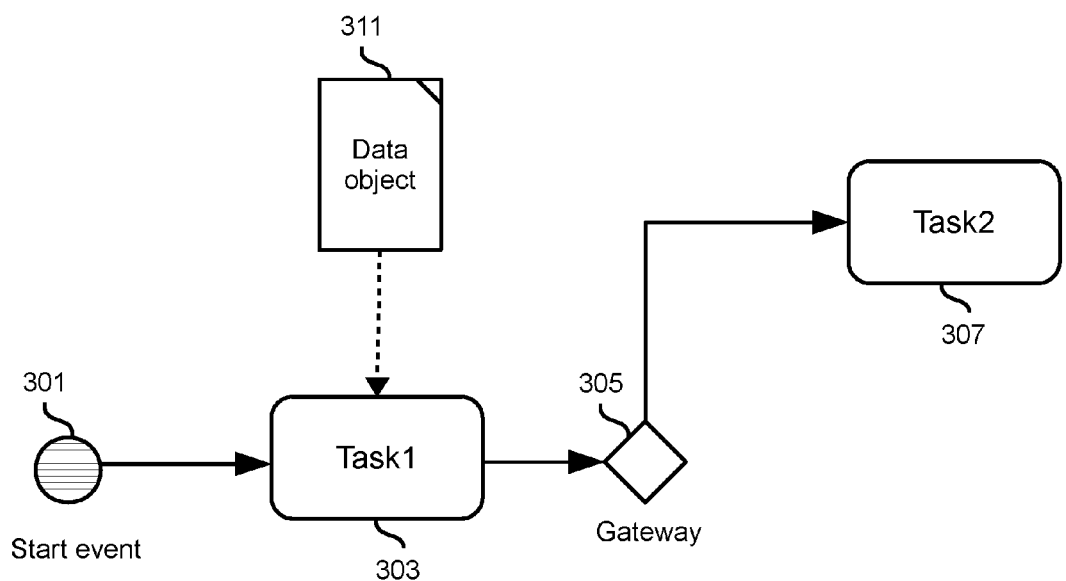
FIG. 3 is a block diagram illustrating an example of a source pattern.
Figure 4:
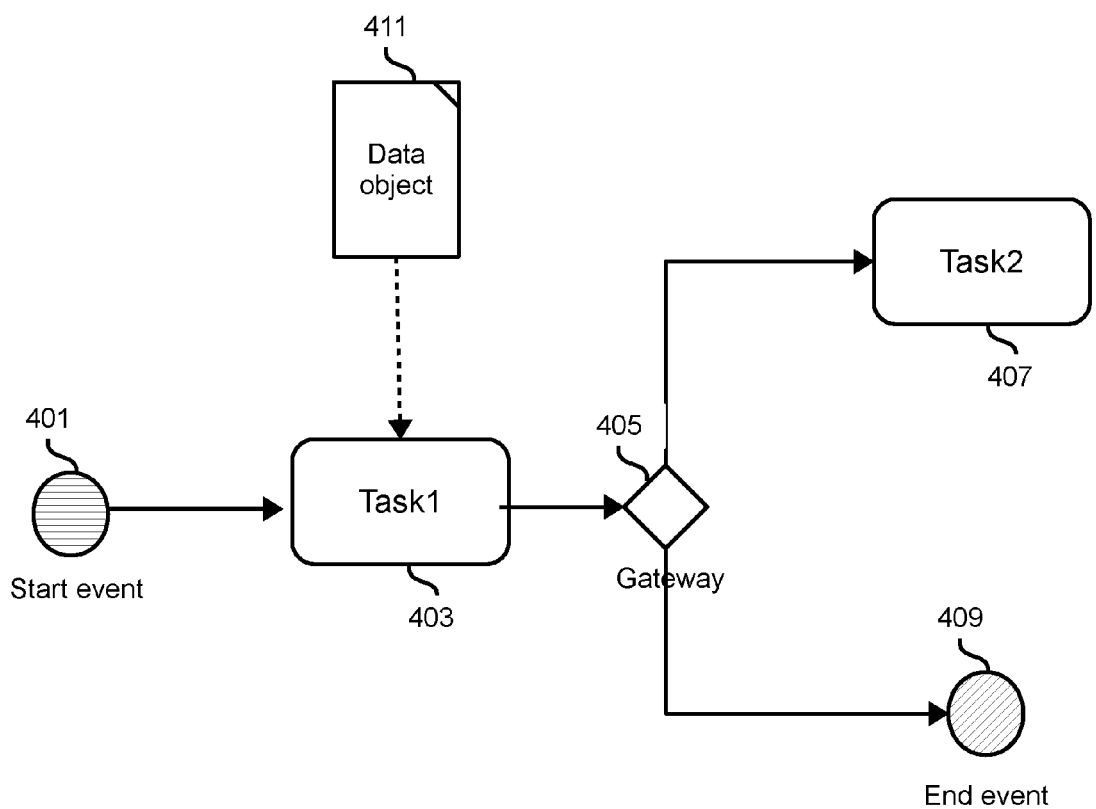
FIG. 4 is a block diagram illustrating an example of a source pattern.

Referring now to FIGS. 2, 3, and 4, block diagrams illustrating an input graph in the BPMN notation, an example of a first source pattern, and an example of a second source pattern, respectively, will be discussed and described. The BPMN notation input graph in FIG. 2 includes an S1 start node 201, an F1 node 203, an F2 node 205, an F3 node 207, and a gateway G1 209; the F1 node 203 receives Data1 211; and the F2 node 205 receives a data object 213. The source pattern in FIG. 3 includes a start event node 301, a Task1 node 303, a gateway 305, and a Task2 node 307; the Task1 node 303 receives a data object 311. If Task1 node 303 is chosen as the starting point, then the source pattern of FIG. 3 matches the F1 node 203 of FIG. 2. Additionally, the gateway 305 of FIG. 3 matches the G1 gateway 209 of FIG. 2. Further, the Task2 node 307 of FIG. 3 matches the F2 node 205 of FIG. 2. For every node of the source pattern in FIG. 3 there exists a comparable node in FIG. 2, (i) of the same type and (ii) with the same connection between the nodes, in the input graph of FIG. 2. This situation is referred to as an input graph that matches a source pattern, that is, for every node in the source pattern, there is, in the input graph in question, a node which is (i) of the same node type, and (ii) has the same connections between nodes of the input graph; the "same connections" means there are the same number of connections and type of connections. FIG. 4 is an example of a not matching pattern. FIG. 2 contains task F2 205 which does not match the end event 409 of FIG. 4.

Applying the source pattern of FIG. 4 to the input graph of FIG. 2 provides a different result. The source pattern includes a start event node 401, a Task1 node 403, a gateway 405, a Task2 node 407, and an end event 409; a data object 411 can be input to the Task1 node 403. However, the source pattern (FIG. 4) does not match the input graph (FIG. 2) because there is no matching node in the input graph of FIG. 2 for the end event 409 of FIG. 4.

The examples of FIG. 2 to FIG. 4 are simplified representations which can be generalized to other, possibly more complex, graphs.

Rule Execution

The rule execution stage can use as input (i) the source pattern of the rule, (ii) the nodes of the input graph which are matching the source pattern, (iii) the target pattern of the rule and (iv) a mapping between the source and the target pattern elements.

Figure 5:
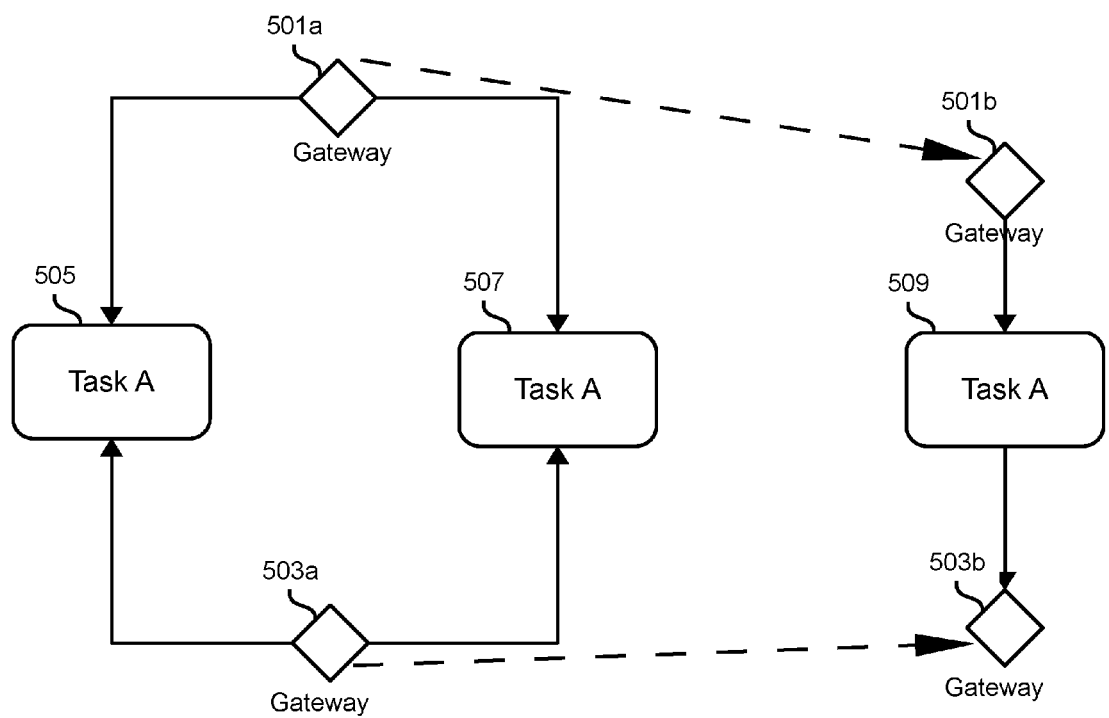
FIG. 5 is a block diagram illustrating an example of a mapping between a source and target pattern elements.

Referring now to FIG. 5, a block diagram illustrating an example of a mapping between a source and target pattern elements will be discussed and described. The mapping can be provided for all nodes that are part of the source and the target pattern. FIG. 5 illustrates two gateways 501a, b, 503a, b (both are illustrated as source (left side) and target (right side), before and after mapping shown by the dashed line), and three TaskA's 505, 507, 509. The mapped nodes gateway 501a, b and gateway 503a, b may remain unchanged during the rule execution. However, the nodes 505 and 507 become node 509 during rule execution. The mapped nodes 501a, b and 503a, b define a context for the rule.

Figure 6:
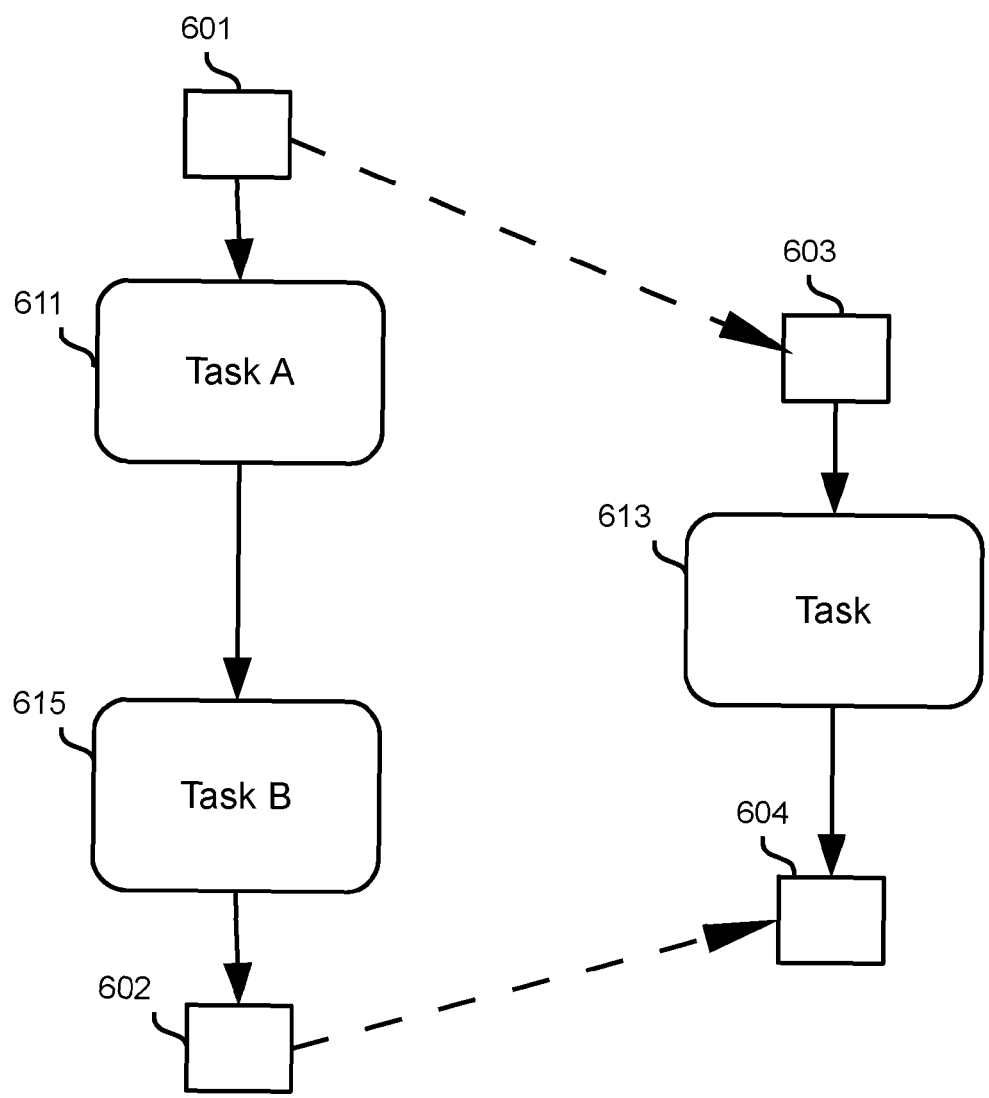
FIG. 6 is a block diagram illustrating an example of a pattern with placeholders.

Referring now to FIG. 6, a block diagram illustrating an example of a pattern with placeholders will be discussed and described. FIG. 6 illustrates Task A 611, Task B 615, and Task 613. If no context for a rule is required or if a connection type defines the context, it is possible to define placeholders in the source and target pattern. The placeholders 601, 602, 603, 604 can correspond to any type of node.

Figure 7:
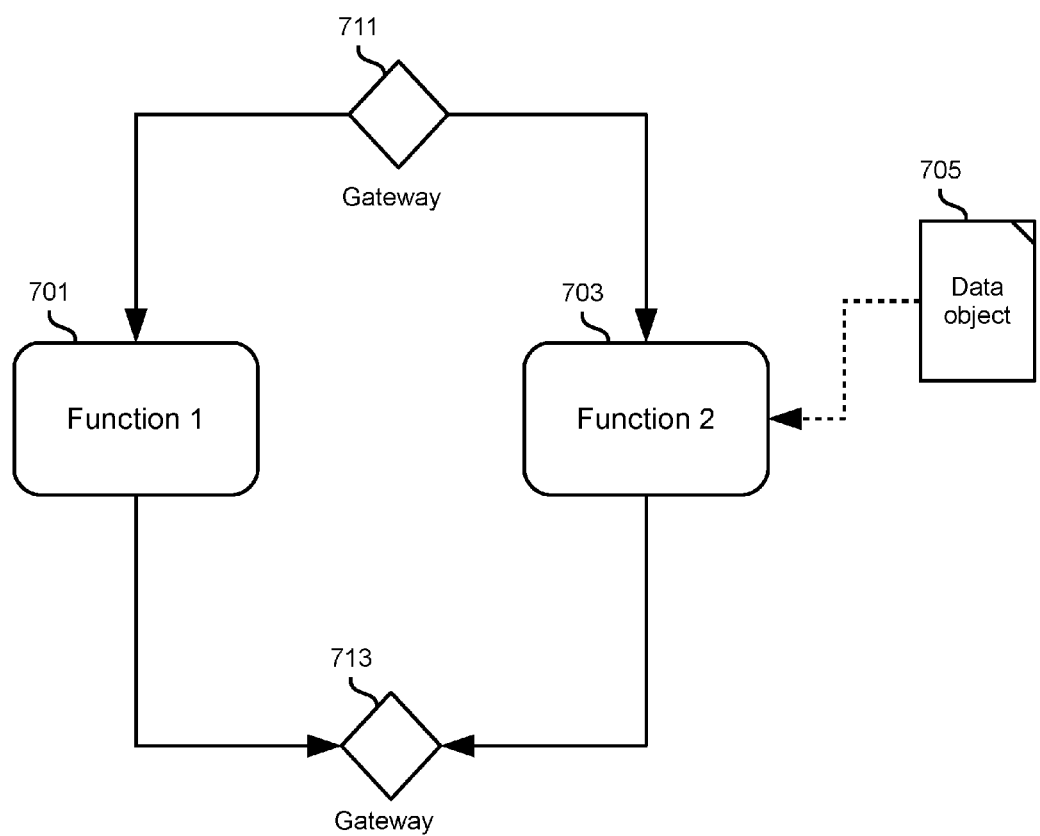
FIG. 7 is a block diagram illustrating an example of an input graph.

Referring now to FIG. 7, a block diagram illustrating an example of an input graph will be discussed and described. FIG. 7 illustrates Function 1 node 701, Function 2 node 703, data object node 705, and gateways 711, 713. For all nodes that will be replaced during the rule execution, the graph syntax validation system checks whether connections are available to elements that are not part of the source pattern. If it is determined that the input graph nodes have connections to nodes that are not present in the source pattern, then the transformation rule cannot be executed for the input graph. For example, it is not possible to execute the rule of FIG. 5 to the input graph of FIG. 7 for the following reasons. While Function 1 node 701 may correspond to Task A node 505, Function 2 node 703 fails to correspond to Task A node 507. In FIG. 7, Function 2 node 703 has a connection to a Data object node 705. There is no comparable connection for Task A 507 in FIG. 5.

Figure 8:
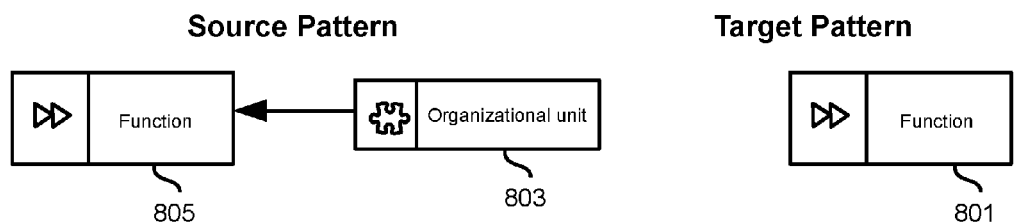
FIG. 8 is a block diagram illustrating an example of a first transformation rule.
Figure 9:
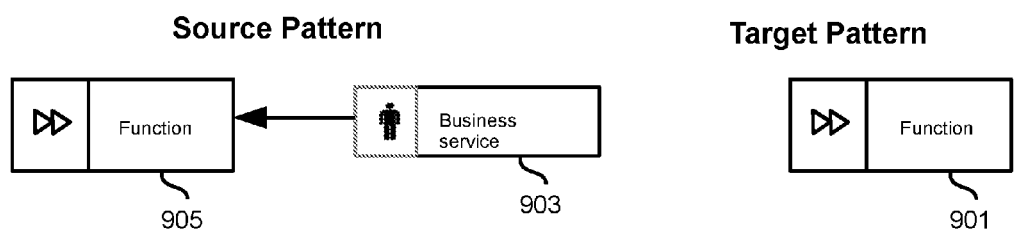
FIG. 9 is a block diagram illustrating an example of a second transformation rule.
Figure 10:
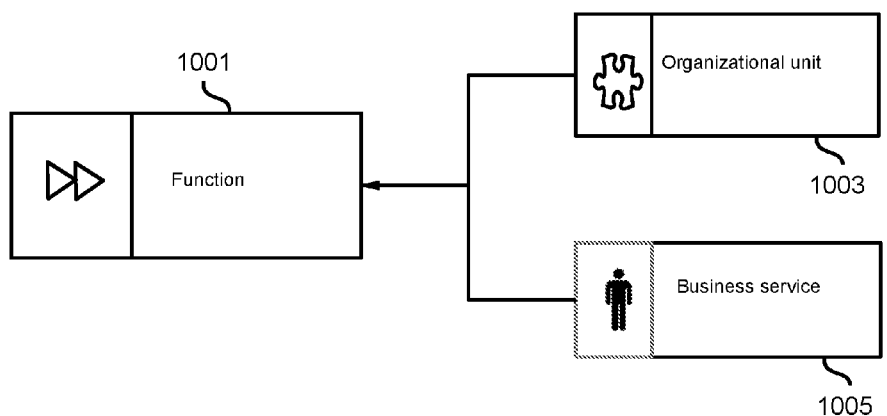
FIG. 10 is a block diagram illustrating an example of an invalid construct.
Figure 11:
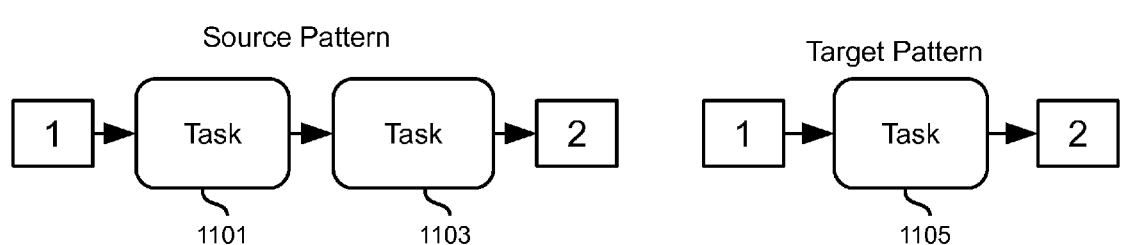
FIG. 11 is a block diagram illustrating an example of a first transformation rule.
Figure 12:
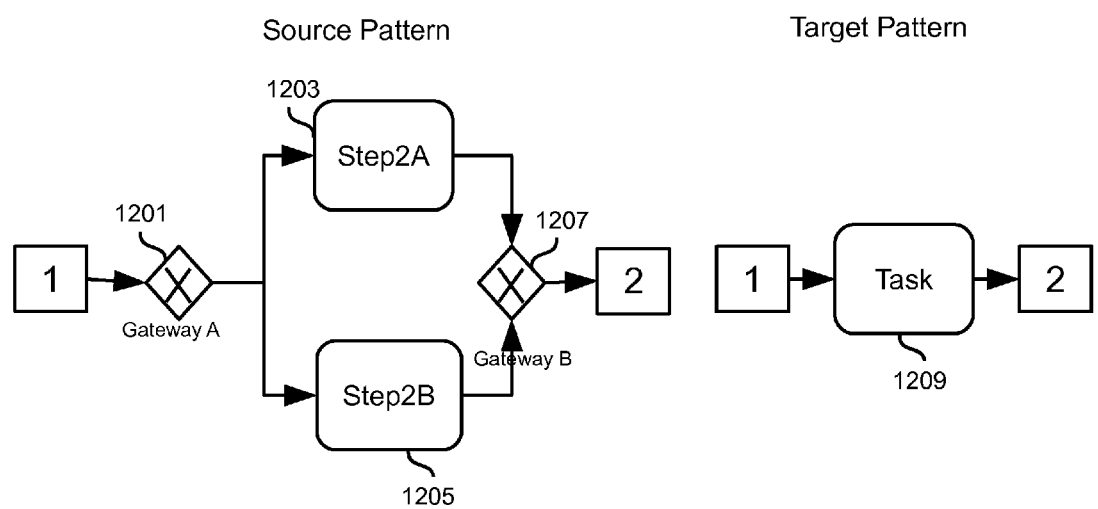
FIG. 12 is a block diagram illustrating an example of a second transformation rule.
Figure 13:
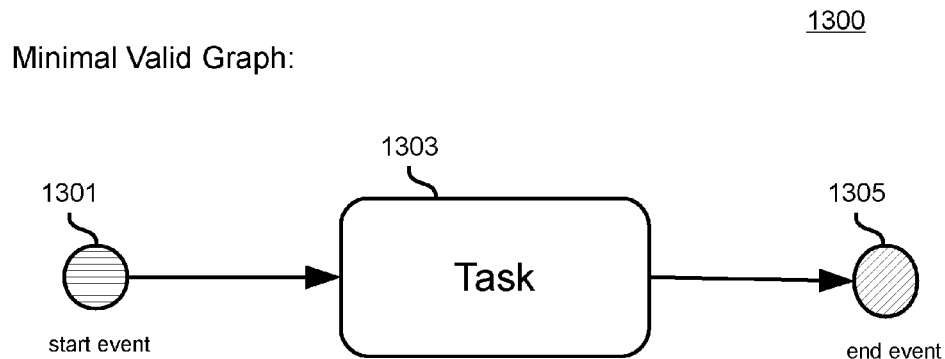
FIG. 13 is a block diagram illustrating an example of a minimal valid graph.

Referring now to FIGS. 8, 9, and 10, block diagrams illustrating examples of a first transformation rule, a second transformation rule, and an invalid construct, respectively, will be discussed and described. In some cases it may be desirable to introduce, to the transformation, new node types that are not part of the graph notation. These node types can be an intermediate result of some of the transformation rules and they may occur in some other transformation rules in the source pattern. The final result will have only valid symbols of the graph notation.

This is exemplified by considering the two rules in FIGS. 8 and 9 and the construct of FIG. 10. FIG. 8 illustrates, under "source pattern", function 801 and organizational unit 803; and under "target pattern", function 803. FIG. 9 illustrates, under "source pattern", function 901 and business service 903; and under "target pattern", function 905. FIG. 1 illustrates function 1001, organizational unit 1003, and business service 1005. In the invalid construct a function 1001 is connected to both an "Organizational unit" 1003 and a "Business service" 1005, but only one of these connections should be allowed. The transformation rules of FIGS. 8 and 9 are transforming a function 805, 905 with an "Organizational unit" 803/"Business service" 903 into a function 801, 901, respectively. In traditional graph syntax validation systems, both rules would be applied to the invalid pattern and the result would be a function. To prohibit this incorrect result, the present graph syntax validation system can alter the rule patterns using non-terminal symbols that are not part of the notation. Using the presently disclosed system, the target pattern 801 of the first rule would be categorized as one type of function (for example, "a manual function") node type. The target pattern, function 901, of the second rule would be categorized as another type of function (for example, "a service function") node type. The first rule of FIG. 8 would first transform the invalid construct of FIG. 10 into a "manual function." The second rule of FIG. 9 would then not match the interim result because the source pattern contains a "service function" node type and not a "manual function" node type. The non-terminal symbols of the graph syntax validation system prevent invalid constructs.

Transformation Algorithm

The algorithm for the executions of the graph syntax validation system can be provided as in the following example pseudo-code:

---
Algorithm Graph syntax validation
---
Input: Graph_A (Graph to check), Graph_M (minimal valid graph), Ruleset_A
Output: Success or rest graph
Graph_R = create copy of Graph_A
WHILE Graph_R NOT matching GRAPH_M
  CALL "Match rules to nodes" WITH Ruleset_A, Graph_R
  RETURNING Graph_A;
Rule_Applied
  IF Rule_Applied IS NOT true THEN
    RETURN Graph_A
RETURN success

---

The algorithm requires as input the graph that should be checked (Graph_A), the minimal valid Graph (Graph_M) and a set containing the transformation rules (Ruleset_A). The algorithm returns "success" in the case that the tested graph matches the notation defined in the rule set and the minimal valid graph. Alternatively, it returns a graph (Graph_A) that cannot be transformed further in the case that the input graph does not match the syntax of the notation.

The algorithm can be provided as in the following example pseudo-code procedure:

---
Procedure Match rules to nodes
---
  Input: Ruleset_A, Graph_R
  Output: Graph_R, Boolean if rule was applied
  NODES = select all nodes from Graph_R
  WHILE NODES is not empty
    NODE = select node from NODES
    RULES = create copy of Ruleset_A
    WHILE RULES is NOT empty
      RULE = select rule from RULES
      RULES = remove RULE from RULES
      IF NODE matches RULE source pattern THEN
        Graph_R = apply RULE to Graph_R
        RETURN Graph_R; true
    NODES = remove NODE from NODES
  RETURN Graph_R; false

---

In the case where the result of the algorithm indicates that no transformation rule matches, the graph syntax validation system may indicate the nodes within the input graph so as to notify the user regarding which elements of the input graph and/or the transformation rules and/or the minimal valid graph are causing the invalid syntax. The system can also or alternatively generate a text from the non-matching patterns to identify and/or to explain which elements of the input graph and/or the transformation rules and/or the minimal valid graph are causing the mismatch.

Figure 14:
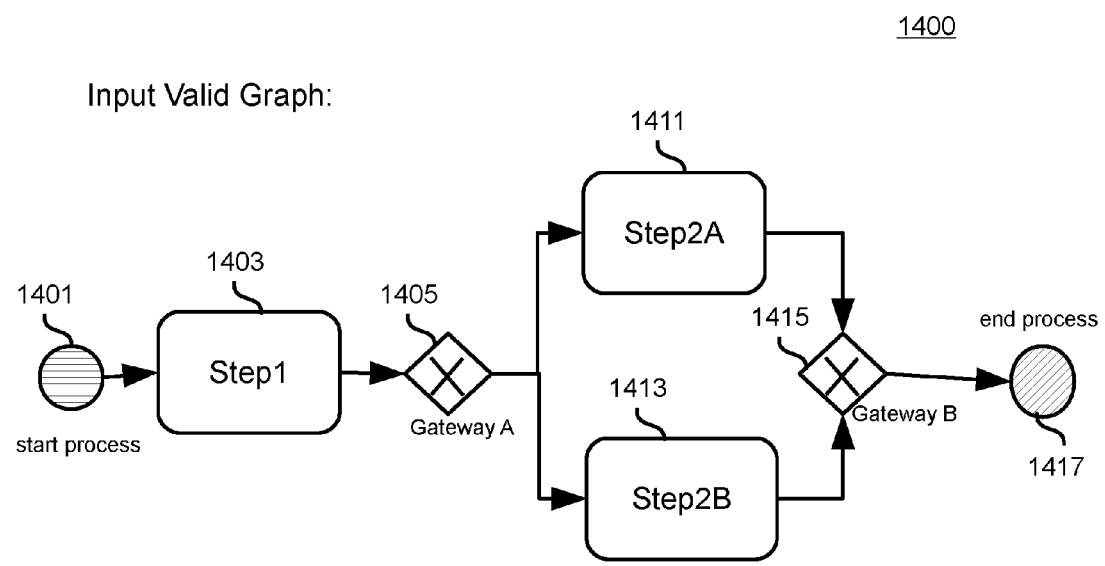
FIG. 14 is a block diagram illustrating an example of an input graph.
Figure 15:
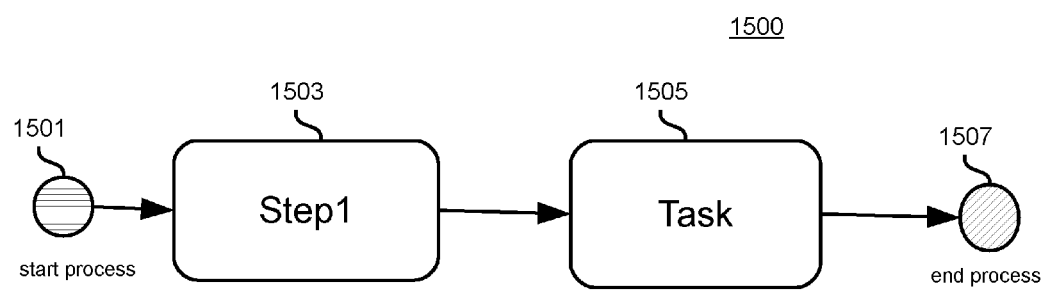
FIG. 15 is a block diagram illustrating an example of a first intermediate result graph.
Figure 16:
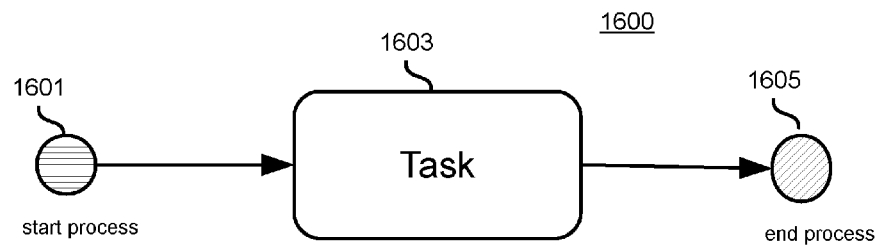
FIG. 16 is a block diagram illustrating an example of a second intermediate result graph.

Referring now to FIGS. 11-16, an example of a successful validation will be discussed and described. The transformation rule set for this example consists of two rules, which are representative of a transformation rule set that may include any plurality of rules for example, two or more rules. The first rule (see FIG. 11) consists of source pattern with two task nodes (Task node 1101 and Task node 1103) and a target pattern that combines two task nodes into one Task node 1105. The second rule (see FIG. 12) consists of a source pattern with a gateway A 1201, two step nodes (Step2A 1203 and Step2B 1205), and a gateway B 1207. The target pattern for the second rule combine four elements into one Task 1209. The minimal valid graph (see FIG. 13) in this example consists of a start event 1301, a Task 1303, and an end event 1305; this example is simplified and representative of other minimal valid graphs which may have more tasks, connections, and/or structure(s). FIG. 14 illustrates input graph 1400, start process 1401, Step 1 1403, Gateway A 1405, Step2A 1411, Step2B 1413, Gateway B 1415, and end process 1417. Using first and second rules and the minimal valid graph to check the syntax of input graph 1400 (see FIG. 14), the graph syntax system will first determine if input graph 1400 matches the minimal valid graph 1300. There is no match at this point; so input graph 1400 is next compared to the first rule. The first rule does not match because the Start process 1401 node of the input graph does not match any task of the first rule. The second rule also does not match because the Start process 1401 of the input graph does not have match in the second rule, e.g., does not match the Gateway A 1201. Since both first and second rules fail to have a match apply to the Start process 1401, the system next considers the next node, Step1 1403, of the input graph 1400. Both first and second rules do not have a match for the Step1 1403 node, so the system next considers the Gateway A 1407 node of the input graph. The first rule does not have a match for the Gateway A 1407 node, however the second rule does have a match. It is at this point that the system can execute the second rule and form a first intermediate result graph 1500 as shown in FIG. 15 illustrates a first intermediate result graph 1500, start process 1501, Step 1 1503, Task 1505, and end process 1507. Upon forming the first intermediate result graph 1500, the system can restarts the transformation process, this time with the intermediate result graph 1500. The intermediate result graph 1500 can be first checked against the minimal valid graph 1300. The intermediate result graph 1500 does not match the minimal valid graph 1300 because graph 1500 contains an additional task step. Next the system can compare graph 1500 to the first rule 1100 and the second rule 1200. Neither rule matches the first node, which is start process 1501, so there is no match for the start process node 1501. The system next considers Step1 node 1503 in relation to the first rule 1100, second rule 1200, and minimal valid graph 1300. The first rule 1100 is a match and executing the first rule 1100 results in a second intermediate result graph 1600 (see FIG. 16). FIG. 16 illustrates a second intermediate result graph 1600, start process 1601, task 1603, and end process 1605. The second intermediate result graph 1600 can then be checked against the minimal valid graph 1300. This time there is a match, which means that the graph syntax validation system can return a result indicating that the original input graph 1400 matches the syntax defined by both first rule 1100 and second rule 1200.

Figure 17A:
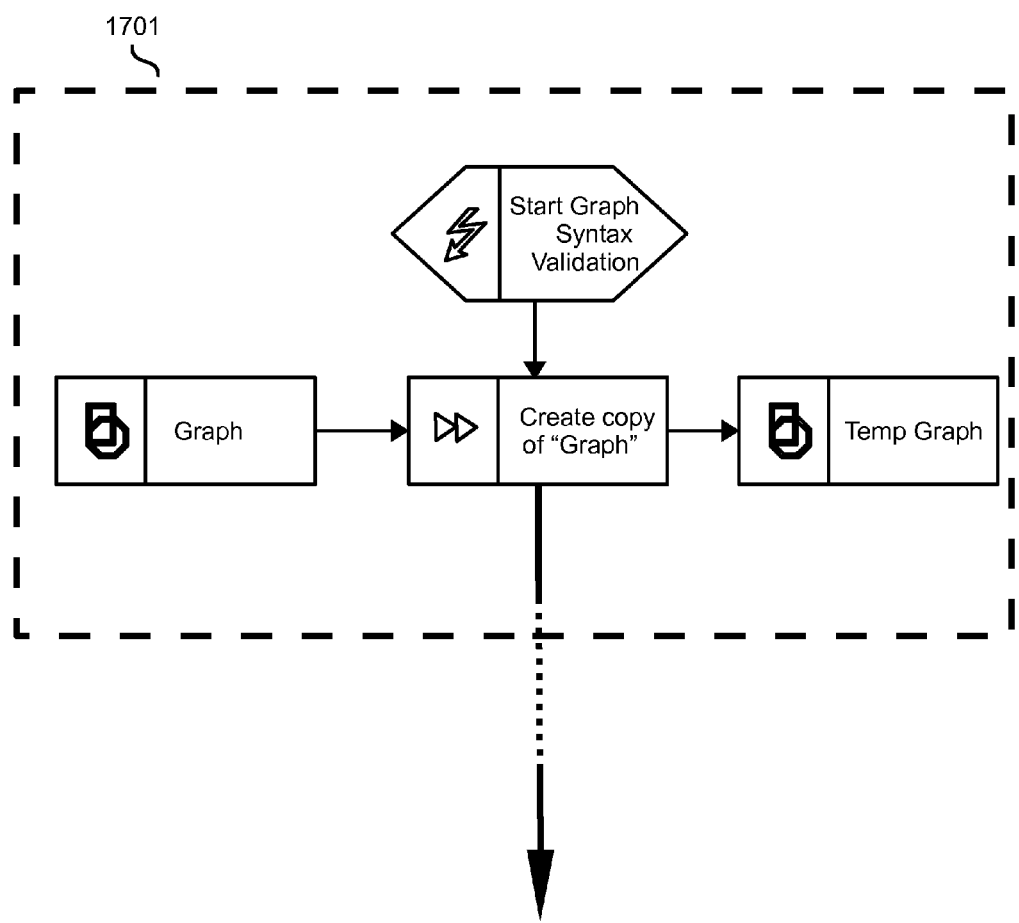
FIG. 17A is a block diagram illustrating an example of the input portion of a control flow implemented as a program in Java.
Figure 17B:
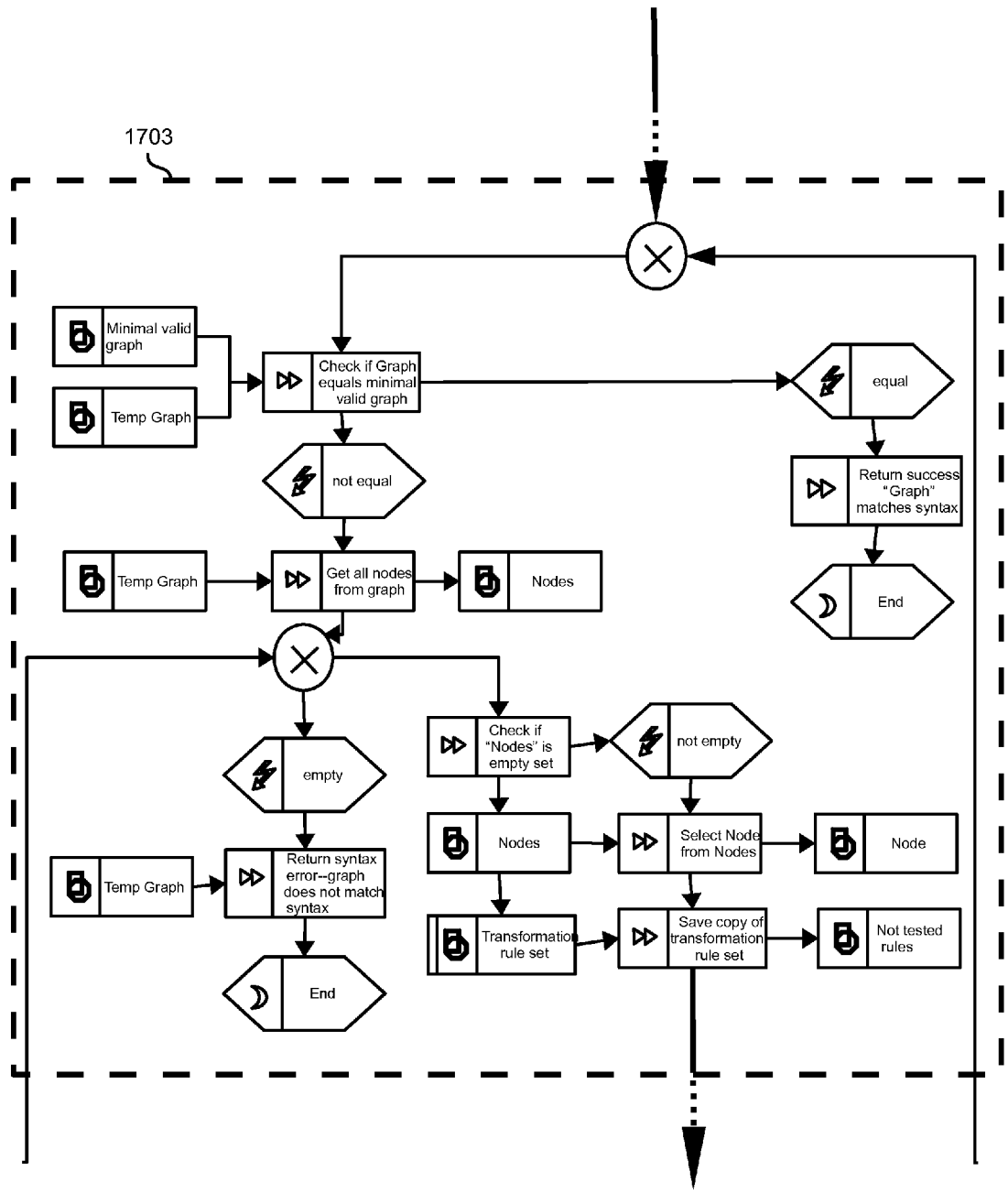
FIG. 17B is a block diagram illustrating an example of a source pattern-matching portion of a control flow implemented as a program in Java.
Figure 17C:
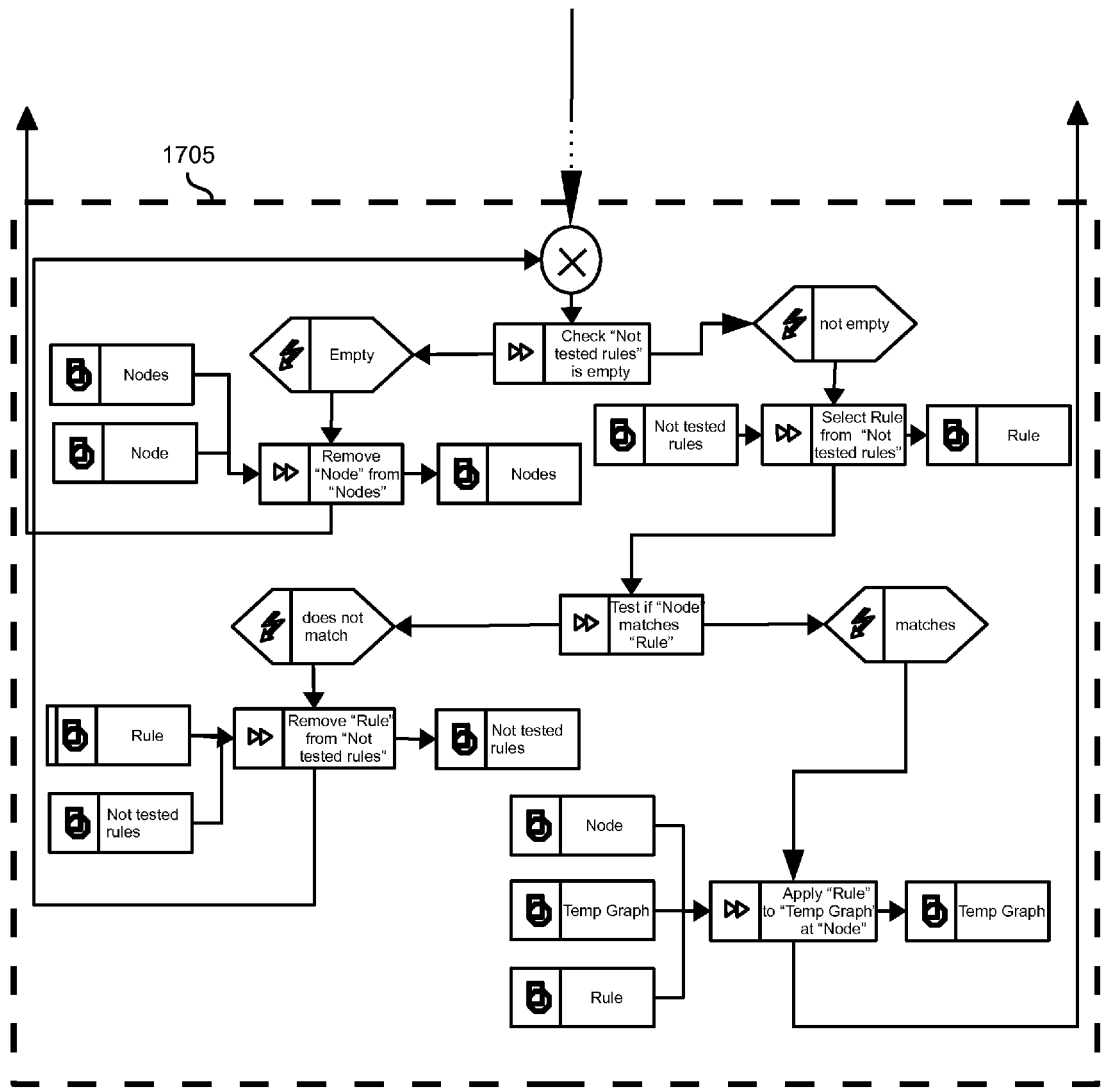
FIG. 17C is a block diagram illustrating an example of a rule-executing portion of a control flow implemented as a program in Java.

Referring now to FIGS. 17A, 17B, and 17C, block diagrams collectively illustrating an example of a control flow implemented as a program in Java will now be discussed and described. The graph syntax validation system can be implemented using a variety of programs, including Java. The control flow demonstrates the input requirements for the system and the process for comparing each node with each transformation rule. An example of the input portion 1701 of the control flow is illustrated in FIG. 17A. The input graph is copied and saved as a Temp Graph.

An example of the source pattern-matching portion 1703 of the control flow is illustrated and detailed in FIG. 17B. The Temp Graph (which is, at this juncture, the same as the input graph) is compared to the minimal valid graph. If the graphs are equivalent, then the system indicates that the input graph uses a valid syntax. If the graphs are not equivalent, then all the nodes are checked for source pattern-matching as described previously, herein.

An example of the rule-executing portion 1705 of the control flow is illustrated and detailed in FIG. 17C. If the structure of the Temp Graph matches a source pattern, then the applicable target rule is applied in the rule-executing part of the control flow, as described previously, herein. The graph that results, from applying the graph-simplifying target rule, becomes the new Temp Graph which is then compared to the minimal valid graph.

The source pattern-matching and the rule-executing occur recurrently until the system determines that the input graph has either been successfully reduced to the minimal valid graph (and is deemed to be a valid syntax) or until the input graph is in its most simplified form, but still does not match the minimal valid graph (and is deemed to be an invalid syntax).

Figure 18:
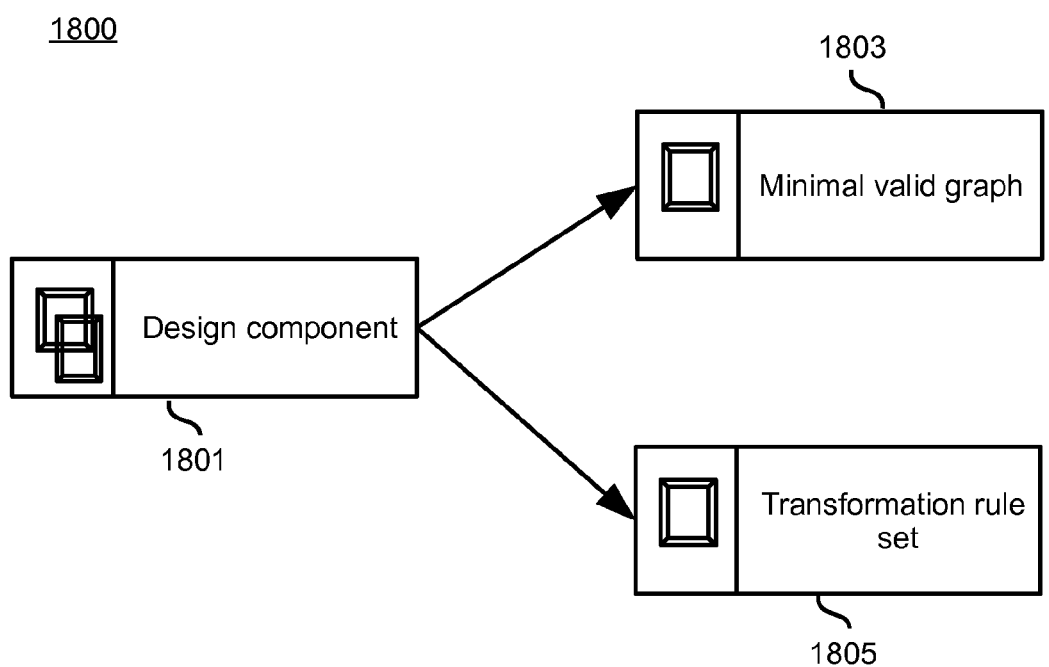
FIG. 18 is a block diagram that depicts a design component for the minimal valid graph and the transformation rule set.

Referring now to FIG. 18, a block diagram that depicts a design 1801 component for a minimal valid graph 1803 and a transformational rule set 1805 will be discussed and described. A graph syntax validation system 1800 can receive a minimal valid graph 1803 and a transformation rule set 1805 as input. The design component 1801 can provide the tools needed for the user to define these types of input.

Figure 19:
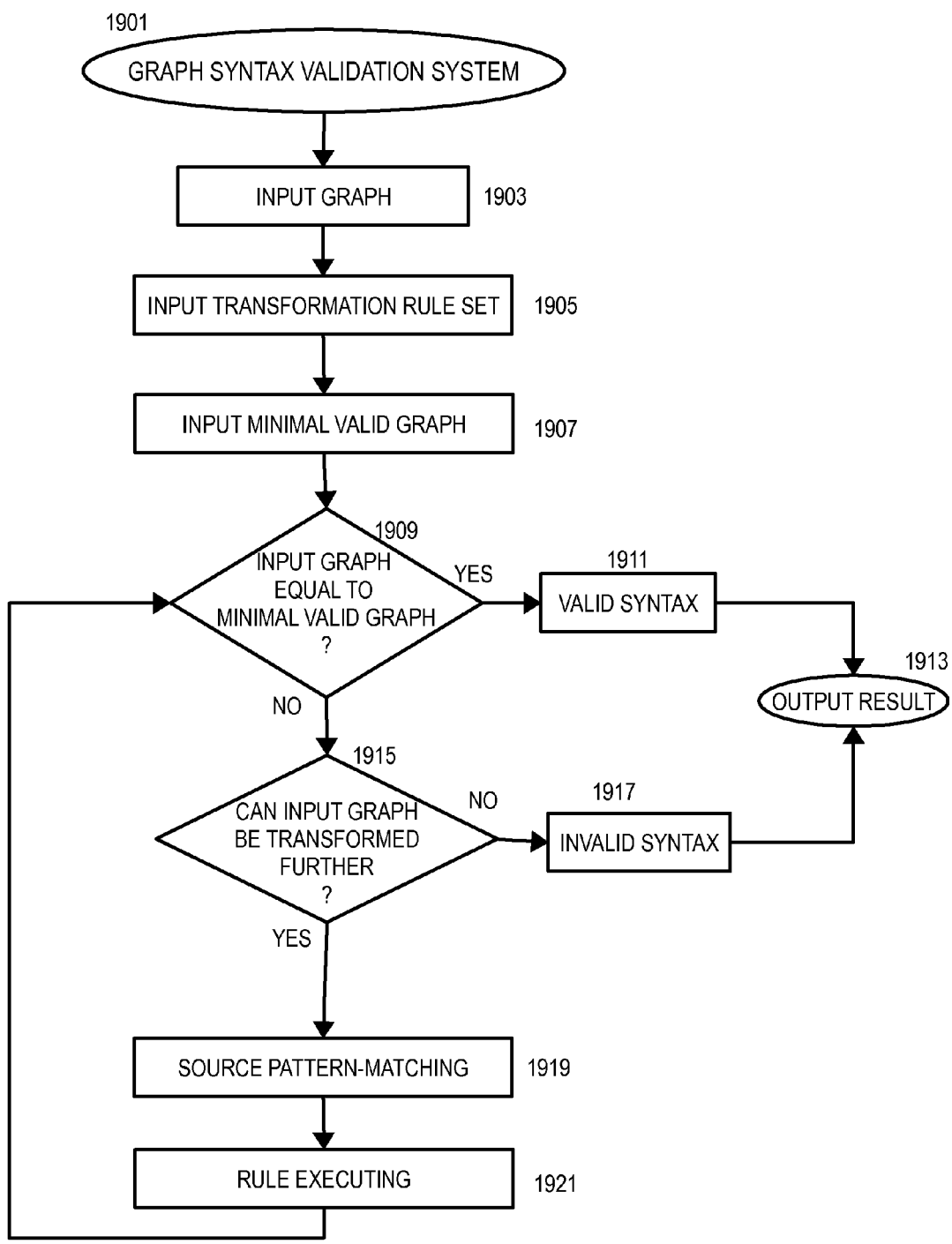
FIG. 19 is a flowchart of the process for determining whether the syntax of an input graph is valid.

Referring now to FIG. 19, a flow chart illustrating the graph syntax validation system procedure 1901 for checking the validity of the input graph syntax will be discussed and described. A graph to be checked can be input 1903 into the system, for example, input by a user, selected by a user, retrieved from one or more previously stored graphs, or similar. The transformation rule set is input 1905 into the system, for example input by a user, selected by a user, retrieved from one or more previously stored transformation rule sets, or similar. The minimal valid graph is input 1907 into the system, for example, input by a user, selected by a user, retrieved from one or more previously stored graphs, or similar. The system can determine 1909 whether the input graph equals the minimal valid graph, meaning that the structure (nodes and connections) are the same. If they are equivalent the system deems the original input graph syntax to be valid 1911 and can outputs 1913 the results. If they are not equivalent, the system can determine 1915, whether the input graph can be transformed further. If not, then the system deems 1917 the original input graph syntax to be invalid and outputs 1913 the results. If so, then the input graph is source pattern matched 1919. When a node is determined to match a transformation rule, then the rule executing 1921 occurs, and, recursively, the intermediate result graph is analyzed to determine whether 1909 the input graph is equal to the minimal valid graph. This process can recur until there is an output result in step 1913.

Figure 20:
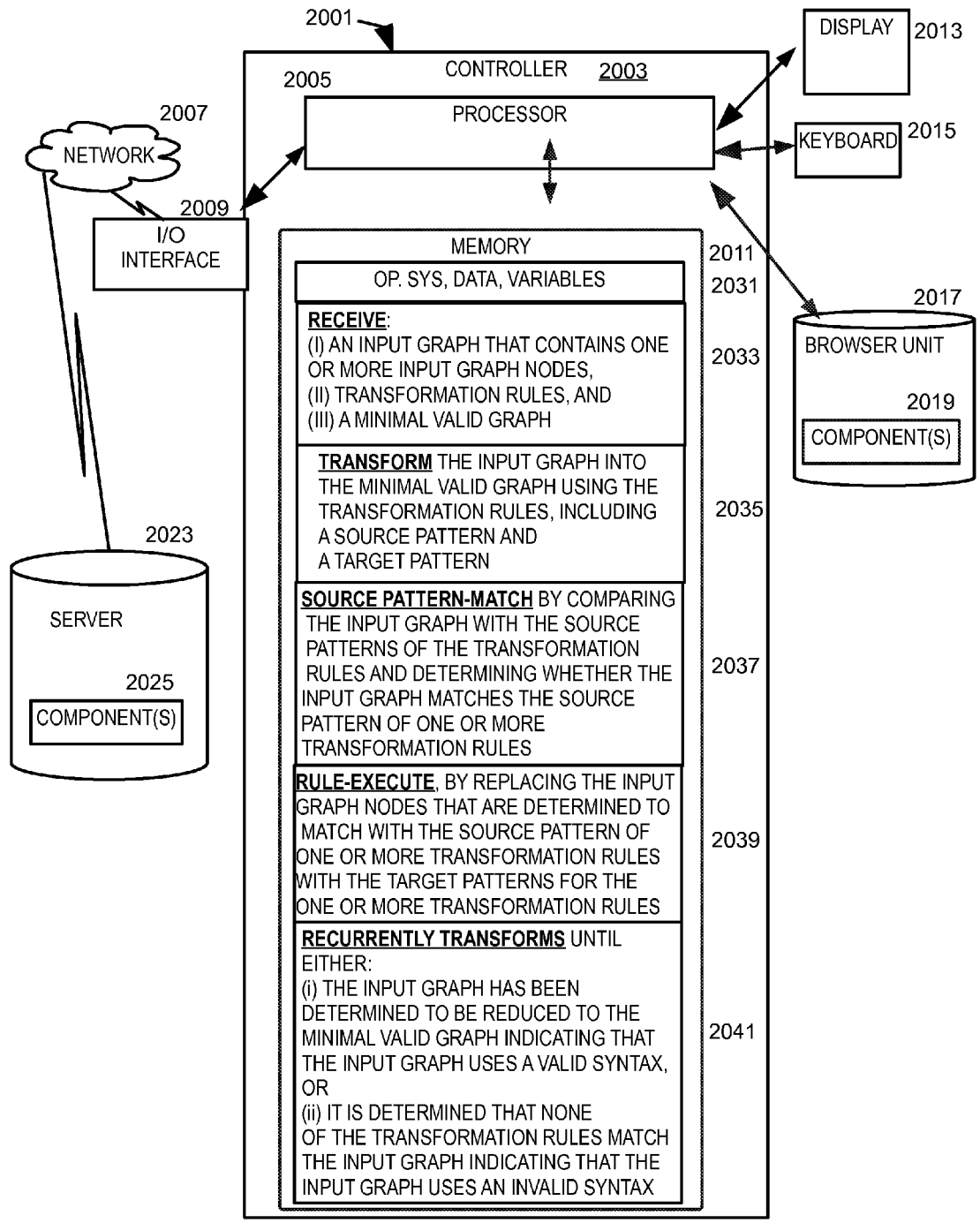
FIG. 20 is a block diagram that depicts relevant portions of a computer system.
Figure 21:
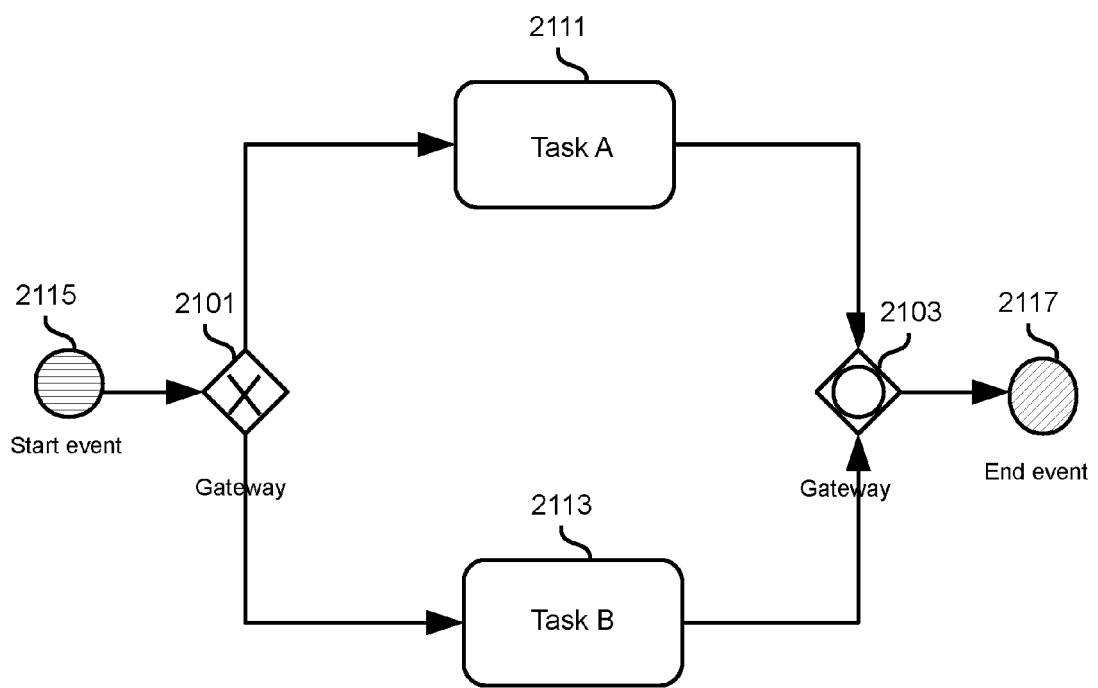
FIG. 21 is an example of a BPMN Collaboration diagram with an invalid syntax.

Referring now to FIG. 20, a block diagram illustrating relevant portions of a computer system 2001 will be discussed and described. The computer system 2001 may include one or more controllers 2003, a processor 2005, an input/output (i/o) interface 2009 for communication such as with a network 2007, a memory 2011, a display 2013 (optional), and/or a user input device (optional) such as a keyboard 2015. Alternatively, or in addition to the keyboard 2015, a user input device may comprise one or more of various known input devices, such as a keypad, a computer mouse, a touchpad, a touch screen, a trackball, and/or a keyboard. The display 2013 may present information to the user by way of a conventional liquid crystal display (LCD) or other visual display, and/or by way of a conventional audible device (e.g., a speaker) for playing out audible messages. Portions of the computer system 2001 are well understood to those of skill in this area and have been omitted to avoid obscuring the discussion.

The processor 2005 may comprise one or more microprocessors and/or one or more digital signal processors. The memory 2011 may be coupled to the processor 2005 and may comprise a read-only memory (ROM), a random-access memory (RAM), a programmable ROM (PROM), and/or an electrically erasable read-only memory (EEPROM). The memory 2011 may include multiple memory locations for storing, among other things, an operating system, data and variables 2031 for programs executed by the processor 2005; computer programs for causing the processor to operate in connection with various functions such as receiving 2033 (i) an input graph that contains one or more input graph nodes, (ii) transformation rules, and (iii) a minimal valid graph; transforming 2035 the input graph into the minimal valid graph using the transformation rules, including a source pattern and a target pattern; source pattern-matching 2037 by comparing the input graph with the source patterns of the transformation rules and determining whether the input graph matches the source pattern of one or more transformation rules; rule-executing 2039, by replacing the input graph nodes that are determined to match with the source pattern of one or more transformation rules with the target patterns for the one or more transformation rules; and recurrently transforming 2041 until either the input graph has been determined to be reduced to the minimal valid graph indicating that the input graph uses a valid syntax, or until it is determined that none of the transformation rules match the input graph indicating that the input graph uses an invalid syntax. The computer programs may be stored, for example, in ROM or PROM and may direct the processor 2005 in controlling the operation of the computer system 2001. Each of these functions is overviewed below; much of the details are provided elsewhere in this document.

The user may invoke functions accessible through the user input device such as the keyboard 2015. The user input device may comprise one or more of various known input devices, such as a keyboard (2015, illustrated) and/or a pointing device, such as a mouse; the keyboard 2015 may be supplemented or replaced with a scanner, card reader, or other data input device; and the pointing device may be a mouse, touch pad control device, track ball device, or any other type of pointing device.

Responsive to manual signaling from the user input device represented by the keyboard 2015, in accordance with instructions stored in memory 2011, and/or automatically upon receipt of certain information via the i/o interface 2009, the processor 2005 may direct the execution of the stored programs.

The computer system 2001 may be structured to utilize a browser 2017, which may include several browser component(s) 2019.

The computer system 2001 can access a server 2023 on which is stored one or more components, here represented by server component(s) 2025. Although the components 2025 are illustrated as accessed over the network 2007, the components 2025 may be remotely and/or locally accessible from the computer system 2001, over a wired and/or wireless connection; the components 2025 do not need to be limited to a database or a server. Techniques are known for accessing components located in a server 2023, and the like.

With regard to the server 2023 and browser 2017, it may be noted that the computer programs stored in the memory 2011 are illustrated on the controller 2003. In a client/server embodiment, one or more of the computer programs conveniently may be distributed to the server, such as those marked "SERVER", and one or more of the computer programs conveniently may be distributed to a client side, such as the computer system 2001. In another embodiment, the computer programs may be included on a non-client-server architecture, and the requests between client-server may be omitted. Furthermore, various information utilized herein may be accessed remotely, for example, via the server 2023; as an example, different sets of transformation rules may be served from the server 2023; and/or different minimal valid graphs may be served from the server 2023; and/or different input graphs may be served from the server 2023; and/or these may be stored locally on the computer system 2001.

The processor 2005 may be programmed for receiving 2033 (i) an input graph that contains one or more input graph nodes, (ii) transformation rules, and (iii) a minimal valid graph. This has been discussed above in great detail.

The processor 2005 may be programmed for transforming 2035 the input graph into the minimal valid graph using the transformation rules, including a source pattern and a target pattern. This also has been discussed above. In addition, it should be noted that a user can initiate a check process (which includes the source pattern-matching 2037, rule-executing 2039, and recurrently transforming 2041 toward the minimal valid graph discussed further herein). For example, the user can manually select to start the check process, or can provide all of the desired inputs (transformation rules selection, minimal valid graph selection, given input graph), so as to trigger transformation rules for a given input graph, to transform into the minimal valid graph using the one or more transformation rules.

The processor 2005 may be programmed for source pattern-matching 2037 by comparing the input graph with the source patterns of the transformation rules and determining whether the input graph matches the source pattern of one or more transformation rules. Again, this has been discussed above in detail.

The processor 2005 may be programmed for rule-executing 2039, by replacing the input graph nodes that are determined to match with the source pattern of one or more transformation rules with the target patterns for the one or more transformation rules. This also has been discussed in detail.

The processor 2005 may be programmed for recurrently transforming 2041 until either the input graph has been determined to be reduced to the minimal valid graph indicating that the input graph uses a valid syntax, or until it is determined that none of the transformation rules match the input graph indicating that the input graph uses an invalid syntax. Again, this has been discussed in detail. It may be noted in some embodiments that the transformation rules can be executed independent from their order. As discussed elsewhere, parts of the input graph which are inconsistent with the transformation rules and/or minimal valid graphs can be indicated, such as by providing a portion of the input graph that failed to match, or providing a trail of actions taken during source pattern-matching, rule-executing, and/or recurrently transforming and indicating when the failure occurred. In still another embodiment, candidate suggestions are provided as to possibilities for replacing one or more parts of the input graph which are inconsistent with the transformation rules and caused a failure to match the transformation rules, i.e., by suggesting rules in the transformation rules which would match.

In an embodiment, the process of rule matching and execution is iterative; in each one transformation step only one matching rule is executed. The executed rule forms a new graph for the next transformation step. After the transformation step is done, the pattern matching may be started again to find a matching rule. That is, (1) pattern matching, (2) execution of a rule, preferably a single rule, (3) check minimal graph, (4) if not, repeat back to (1).

As will be understood in this field, besides the functions discussed above, the memory 2011 can include other miscellaneous information in a misc. database, not shown, along with the usual temporary storage and other instructions for other programs not considered herein. For example, graphs and temporary variables and/or other data structures may be stored in free portions of the memory 2011.

The computer system 2001 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 2005, memory 2011, a disk drive and/or removable storage medium are referred to as "computer-readable storage media" and provide non-transitory storage of computer programs and data.

It should be understood that FIG. 20 is described in connection with logical groupings of functions or resources. One or more of these logical groupings may be performed by different components from one or more embodiments. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

The detailed descriptions, which appear herein, may be presented in terms of program procedures executed on a computer or a network of computers. These procedural descriptions and representations herein are the means used by those skilled in the art to most effectively convey the substance of their work to others skilled in the art.

Further, an embodiment has been discussed in certain examples as if it is made available by a provider to a single customer with a single site. An embodiment may be used by numerous users, if preferred, and the users can be at one or more sites.

The system used in connection herewith may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

Terms as used herein are intended to be interpreted as understood to one of skill in the art of graph based information systems primarily, and secondarily in the art of information systems, and thirdly in the art of computer sciences, instead of as interpreted by a more general dictionary.

Furthermore, the networks of interest for communicating between computers onto which some embodiments may be distributed include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), Net BIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for graph syntax validation comprising:
receiving, by a processor, (i) an input graph that contains one or more input graph nodes, the input graph is checked for use of valid syntax or invalid syntax, (ii) transformation rules, and (iii) a minimal valid graph,
wherein the input graph nodes indicate, in a graph notation, types of nodes,
wherein the types of the nodes include functions, events, and gateways,
where a syntax is defined by the transformation rules;
transforming, by the processor in response to receiving the input graph, the input graph toward the minimal valid graph using the transformation rules, each of the transformation rules includes a source pattern and a target pattern,
further comprising, in the transforming step,
source pattern-matching by comparing the input graph with the source pattern of the transformation rules and determining whether the input graph matches the source pattern of one or more transformation rules; and
rule-executing, by replacing the input graph nodes that are determined to match the source pattern of one or more transformation rules with the target patterns for the one or more transformation rules,
wherein the transforming recurs until either the input graph has been determined to be reduced to the minimal valid graph indicating that the input graph uses the valid syntax, or until it is determined that none of the transformation rules match the input graph indicating that the input graph uses an invalid syntax; and
outputting, by the processor, after the transforming, a result indicating either that the input graph is determined to use the valid syntax or the input graph is determined to use the invalid syntax.

2. The method of claim 1, further comprising result-visualizing, by the processor, the transformation result.

3. The method of claim 1, further comprising design-facilitating, by the processor, the minimal valid graph and the transformation rules.

4. The method of claim 3, wherein the design-facilitating includes the use of non-terminal symbol design tools to generate intermediate transformation results.

5. The method of claim 3, wherein the design-facilitating includes placeholder design tools for use in the source pattern and the target patterns.

6. A graph syntax validation system, comprising:
a processor configured to
receive (i) an input graph that contains one or more input graph nodes, the input graph is checked for use of valid syntax or invalid syntax, (ii) transformation rules, and (iii) a minimal valid graph,
wherein the input graph nodes indicate, in a graph notation, types of nodes,
wherein the types of the nodes include functions, events, and gateways,
wherein a syntax is defined by the transformation rules;
transform, in response to receiving the input graph, the input graph toward the minimal valid graph using the transformation rules, each of the transformation rules includes a source pattern and a target pattern;
source pattern-match by comparing the input graph with the source patterns of the transformation rules and determining whether the input graph matches the source pattern of one or more transformation rules; and
rule-execute, by replacing the input graph nodes that are determined to match with the source pattern of one or more transformation rules with the target patterns for the one or more transformation rules,
wherein the processor recurrently transforms until either the input graph has been determined to be reduced to the minimal valid graph indicating that the input graph uses the valid syntax, or until it is determined that none of the transformation rules match the input graph indicating that the input graph uses an invalid syntax; and
output, after transforming, a result indicating either that the input graph is determined to use the valid syntax or the input graph is determined to use the invalid syntax.

7. The system of claim 6, wherein the processor is further configured to result-visualize the transformation result.

8. The system of claim 6, wherein the processor is further configured to design-facilitate the minimal valid graph and the transformation rules.

9. The system of claim 8, wherein the processor is further configured to design-facilitate using non-terminal symbol design tools to generate intermediate transformation results.

10. The system of claim 8, wherein the processor is further configured to design-facilitate using placeholder design tools in the source pattern and the target patterns.

11. A non-transitory computer readable medium configured to provide a method for graph syntax validation when executable instructions are executed, comprising instructions for:
receiving (i) an input graph that contains one or more input graph nodes, the input graph is checked for use of valid syntax or invalid syntax, (ii) transformation rules, and (iii) a minimal valid graph,
wherein the input graph nodes indicate, in a graph notation, types of nodes,
wherein the types of the nodes include functions, events, and gateways,
wherein a syntax is defined by the transformation rules;
transforming, in response to receiving the input graph, the input graph toward the minimal valid graph using the transformation rules, each of the transformation rules includes a source pattern and a target pattern,
further comprising, in the transforming,
source pattern-matching by comparing the input graph with the source pattern of the transformation rules and determining whether the input graph matches the source pattern of one or more transformation rules; and
rule-executing, by replacing the input graph nodes that are determined to match the source pattern of one or more transformation rules with the target patterns for the one or more transformation rules,
wherein the transforming recurs until either the input graph has been determined to be reduced to the minimal valid graph indicating that the input graph uses the valid syntax, or until it is determined that none of the transformation rules match the input graph indicating that the input graph uses an invalid syntax; and
outputting, after the transforming, a result indicating either that the input graph is determined to use the valid syntax or the input graph is determined to use the invalid syntax.

12. The non-transitory computer-readable medium of claim 11, further comprising result-visualizing, by the processor, the transformation result.

13. The non-transitory computer-readable medium of claim 11, further comprising design-facilitating, by the processor, the minimal valid graph and the transformation rules.

14. The non-transitory computer-readable medium of claim 13, wherein the design-facilitating includes the use of non-terminal symbol design tools to generate intermediate transformation results.

15. The non-transitory computer-readable medium of claim 13, wherein the design-facilitating includes placeholder design tools for use in the source pattern and the target patterns.

* * * * *